M. V. Nobles,
Well Tubing,
Nº 52,249. Patented Jan. 23, 1866.
Fig: 1
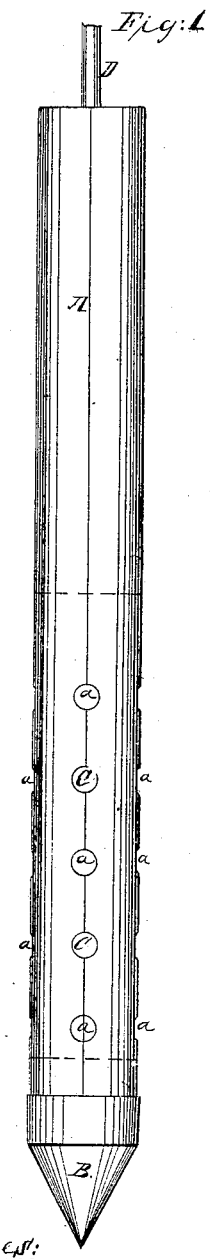
Fig: 3
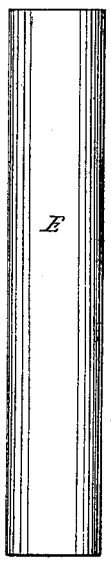
Fig: 2
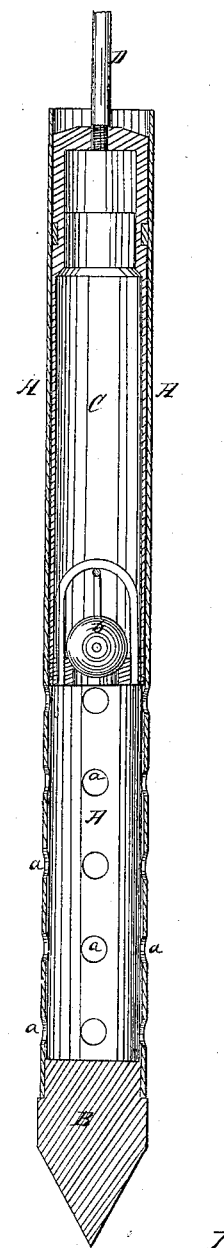
Fig: 4
Witnesses:
Inventor:
Milton V. Nobles.
By atty. A. B. Stoughton.

United States Patent Office.

MILTON V. NOBLES, OF ROCHESTER, ASSIGNOR TO HIMSELF AND JOHN C. NOBLES, OF RUSHFORD, NEW YORK.

IMPROVED MODE OF SINKING TUBULAR WELLS.

Specification forming part of Letters Patent No. 52,249, dated January 23, 1866.

*To all whom it may concern:*

Be it known that I, MILTON V. NOBLES, of Rochester, in the county of Monroe and State of New York, have invented certain new and useful Improvements in Sinking Tubes to Form Wells and Pumps therefor; and I do hereby declare the following to be a full, clear, and exact description of the same, reference being had to the accompanying drawings, making a part of this specification, in which—

Figure 1 represents an external view of the tubular well and pump. Fig. 2 represents a vertical section of the same. Fig. 3 represents a view, and Fig. 4 a section through a plug or stopper which may be used in the process of sinking the tubes.

My invention consists in the use or application of an inner tube in connection with the external one, which inner tube may be forced down by the pump-rod to close the openings in the external tube while it is being driven down to keep out the earth, sand, gravel, &c., or raised up to disclose said openings for the purpose, at any time during the process of sinking, of ascertaining whether water has been reached, said inner tube, with its connected valve, forming a pump, by which the water is raised up from the well.

To enable others skilled in the art to make and use my invention, I will proceed to describe the same with reference to the drawings.

A represents an iron or other metal tube, pointed as at B, for the purpose of being sunk or driven into the ground. The tube, at and near its lower end, is furnished with a series of holes, *a*. Within this outer tube, and near its bottom or lower end, is placed another short tube, C, without any holes in its perimeter, but may be open at its top and bottom. This inner tube should be long enough to cover the series of openings in the outer one, and be capable of snugly fitting but of freely moving in said outer tube or pipe.

To the inner tube, C, is connected, by a screw or otherwise, a rod, D, which extends clear up through the outer tube, and which, when water is reached, becomes the pump-rod for raising up the water to the surface.

When the outer tube is being forced down into the earth the rod D is used for forcing down and raising up the tube C to close the holes *a* or to open them to ascertain whether water has been reached. If not, then the holes are again closed and the sinking of the outer tube goes on.

If water be reached, the inner tube, C, is raised up to or a little above the upper tier of holes, *a*, and, having a valve, *b*, already caged and fixed in place, the pump is ready to be used.

If desirable, and while the tube is being forced down to about where water may be expected to be reached, a plug, E, Figs. 3, 4, may be used for closing the holes *a* against the admission of dirt, sand, &c. This plug may be of wood covered with metal to prevent it from swelling and sticking fast in the outer tube, and it may be made conical at its upper end, as at *c*, so that the rod D may be guided to the screw *d*, where it takes hold to draw it out. But the pump may be made complete, and so driven down into the ground, and when water is reached it is only necessary to raise the inner tube (it being made to stop when the holes are uncovered, as it also does when they are covered) a short distance and work the rod D, after the common manner of pumping. I thus, as it were, drive down a pump into the ground, and when water is reached it is ready to go to work in pumping water, and this, too, without being troubled with the clay or earth being driven into the pump through the water-holes.

Having thus fully described my invention, what I claim therein as new, and desire to secure by Letters Patent, is—

In combination with an external tube furnished with a series of holes, an inner tube without the holes, connected to a rod extending to the surface, by which said inner tube may be raised or lowered to cover or uncover said holes, and with a suitable pump-valve, so that when water is reached it is only necessary to raise the inner tube and work it by the pump-rod, and the pump is complete, substantially as described.

M. V. NOBLES.

Witnesses:
   A. B. STOUGHTON,
   EDM. F. BROWN.